(12) United States Patent
DiStefano, III et al.

(10) Patent No.: US 8,630,830 B1
(45) Date of Patent: Jan. 14, 2014

(54) THERMAL ANALYSIS SYSTEM

(75) Inventors: Frank James DiStefano, III, Houston, TX (US); Craig A. Wobick, Seabrook, TX (US); Kirt Auldwin Chapman, Webster, TX (US); Peter L. McCloud, Shoreacres, TX (US)

(73) Assignee: The Boeing Company, Chicago, IL (US)

( * ) Notice: Subject to any disclaimer, the term of this patent is extended or adjusted under 35 U.S.C. 154(b) by 519 days.

(21) Appl. No.: 12/901,850

(22) Filed: Oct. 11, 2010

(51) Int. Cl.
*G06G 7/50* (2006.01)

(52) U.S. Cl.
USPC .................................................. 703/9; 703/6

(58) Field of Classification Search
None
See application file for complete search history.

(56) References Cited

U.S. PATENT DOCUMENTS

| | | | | |
|---|---|---|---|---|
| 4,977,529 | A * | 12/1990 | Gregg et al. ................ | 703/18 |
| 7,822,586 | B2 * | 10/2010 | Wu et al. ..................... | 703/6 |
| 2011/0131017 | A1 * | 6/2011 | Cheng et al. ................ | 703/2 |

OTHER PUBLICATIONS

Eden et al., "A Heat and Mass Transfer Model for the Simulation of the Wet Limestone Flue Gas Scrubbing Process", Chemical Engineering & Technology, vol. 21, Issue 1, pp. 56-60, Jan. 1998.*

Cullimore, "Optimization and Automated Data Correlation in the NASA Standard Thermal_Fluid System Analyzer", 33rd Intersociety Engineering Conference on Energy Conversion, Aug. 1998, pp. 1-10.*

"User's Manual SINDA/FLUINT General Purpose Thermal/Fluid Network Analyzer Version 5.3", Nov. 2009, C&R Technologies, Boulder Colorado, pp. 1-70.

Perry, "Trace Contaminant Control Simulation Computer Program—Version 8.1", May 1994, Nasa Technical Memorandum 108457, pp. 1-134.

"User's Manual SINDA/FLUINT General Purpose Thermal/Fluid Network Analyzer Version 5.2", Oct. 2008, C&R Technologies, Boulder Colorado, pp. 1-1432.

* cited by examiner

*Primary Examiner* — Thai Phan
*Assistant Examiner* — Herng-Der Day
(74) *Attorney, Agent, or Firm* — Yee & Associates, P.C.

(57) ABSTRACT

A thermal fluid system modeler including a plurality of individual components. A solution vector is configured and ordered as a function of one or more inlet dependencies of the plurality of individual components. A fluid flow simulator simulates thermal energy being communicated with the flowing fluid and between first and second components of the plurality of individual components. The simulation extends from an initial time to a later time step and bounds heat transfer to be substantially between the flowing fluid, walls of tubes formed in each of the individual components of the plurality, and between adjacent tubes. Component parameters of the solution vector are updated with simulation results for each of the plurality of individual components of the simulation.

9 Claims, 19 Drawing Sheets

```
void HTE::Set_Outlet_All_XGas( Time_Block *tb, double total_mass, double old_total_mass,
                                                                    double mass_flow_rate )
{
        Outlet *main_outlet_ptr;
        Outlet *outlet_ptr;
        XGAS *main_xgas_ptr;
        XGAS *xgas_ptr;

double avg_inlet;
        double avg_outlet;
        double xgas_added;
        double dt = tb->increment;
```

FIG. 11

```
        for( int i = 0; i < outlets->size(); i++ )
        {
                main_outlet_ptr = Get_Outlet(i);
                if(main_outlet_ptr != NULL && main_outlet_ptr->XGasses->size() > 0)
                        break;   //get first outlet with XGas information
        }
```

FIG. 12

```
        if(xgas_calc == FALSE)
        {
                for( int j = 0; j < main_outlet_ptr->XGasses->size(); j++ )
                {
                        main_xgas_ptr = main_outlet_ptr->Get_XGas(j);
                        avg_inlet = Average_Inlet_XGas( main_xgas_ptr->gasname );
                        avg_outlet = Average_Outlet_XGas( main_xgas_ptr->gasname );
                        xgas_added = 0.0;

for( int k = 0; k < outlets->size(); k++ )
                        {
                                outlet_ptr = Get_Outlet(k);

xgas_ptr = outlet_ptr->Get_XGas(j);
```

FIG. 13

```
if(xgas_ptr->amount_on && !xgas_ptr->rate_on)
{
        xgas_added += xgas_ptr->desired_amt-xgas_ptr->amount_released;
        xgas_ptr->amount_released = xgas_ptr->desired_amt;
        xgas_ptr->amount_on = FALSE;
}
```

FIG. 14

```
else if(!xgas_ptr->amount_on && xgas_ptr->rate_on)
{
        xgas_added += dt * xgas_ptr->rate;
}
```

FIG. 15

```
else if(xgas_ptr->amount_on && xgas_ptr->rate_on)
{
        if((dt*xgas_ptr->rate + xgas_ptr->amount_released)
            > xgas_ptr->desired_amt)   //Check for rate that will exceed amount in one time step
            (use amount calculation)
                xgas_added += xgas_ptr->desired_amt - xgas_ptr->amount_released;
        else
                xgas_added += dt * xgas_ptr->rate;
        xgas_ptr->amount_released += xgas_ptr->rate * dt;
        if(xgas_ptr->amount_released >= xgas_ptr->desired_amt)
        {
                xgas_ptr->rate_on = FALSE;
                xgas_ptr->amount_on = FALSE;
                xgas_ptr->amount_released = xgas_ptr->desired_amt;
        }
}
```

FIG. 16

```
                        if(total_mass > old_total_mass && total_mass > 0.0 &&
old_total_mass > 0.0)
                                avg_outlet = avg_outlet * (old_total_mass/total_mass);

if(total_mass > 0.0)
                                avg_outlet += ((avg_inlet - avg_outlet) * mass_flow_rate * dt
+ xgas_added) / total_mass;
                        else
                                avg_outlet = avg_inlet + xgas_added / (mass_flow_rate * dt);
                        Set_Outlet_XGas( avg_outlet, main_xgas_ptr->gasname, 0.0 );
                }
        } xgas_calc = TRUE;
}
```

FIG. 17

```
void Air_Scrubber::XGas_TCCS(Time_Block *tb, std::ostream* report)
{
Outlet *main_outlet_ptr;
XGAS *main_xgas_ptr;

double inlet_temperature;
double inlet_pressure;
double mass_flow_rate;
double fluid_density = 0.0;
double volume_flow_rate = 0.0;

double avg_inlet;
double avg_outlet;
double dt = tb->increment;
double efficiency = 0.0;
double efficiency2 = 0.0;
double efficiency_sum = 0.0;
double poison_sum = 0.0;

inlet_pressure = Inlet_Pressure();
inlet_temperature = Average_Inlet_Temperature(report);

mass_flow_rate = Total_Mass_Flow_Rate();

fluid_density = fluid_properties->Density(inlet_temperature,inlet_pressure);     //result - lb/ft3
volume_flow_rate = (mass_flow_rate/fluid_density);     //result - ft3/hr main_outlet_ptr = Get_Outlet(0);
```

FIG. 18A

```
if(main_outlet_ptr != NULL && xgas_calc == FALSE)
{
    for(int i = 0; i < main_outlet_ptr->XGasses->size(); i++)
    {
        main_xgas_ptr = main_outlet_ptr->Get_XGas(i);
        avg_inlet = Average_Inlet_XGas( main_xgas_ptr->gasname );
        efficiency_sum = 0.0;

if( avg_inlet < 1E-26)    //equation limits - 1E-20 limit for mg/m3, 1E-26 for lb
cont./lb air @ 77 degf, 1 atm
        {
            avg_inlet = 0.0;
            Set_Outlet_XGas( avg_inlet, main_xgas_ptr->gasname, 0.0 );
        }
        else
        {
            if(method == 3) //Radial charcoal beds in two LiOH cans
            {
                volume_flow_rate = 30 * 60;    //30 cfm - LiOH single can
flow rate (when considering bypassed flow), result - ft3/hr for(int j = 0; j < 2; j++)    //loop for both canisters
                {
                    efficiency = 0.0;
                    efficiency2 = 0.0;

if(acid[j] && _stricmp("Ammonia",
main_xgas_ptr->gasname)==0)
                    {
                        efficiency = Get_Acid_Treated_Eff(radial,
main_xgas_ptr->bed_m_adsorbed[j]);
                    }
                    else if(chromate[j] && _stricmp("Formaldehyde",
main_xgas_ptr->gasname)==0)
                    {
                        efficiency = Get_Chromate_Imp_Eff(radial,
main_xgas_ptr->bed_m_adsorbed[j],
                                    volume_flow_rate);
                    }
                    else
                    {
                        efficiency = Get_Untreated_Eff(radial, j,
main_xgas_ptr, avg_inlet, inlet_temperature,
                                    volume_flow_rate*fluid_density,
fluid_density, volume_flow_rate, dt);
                    }
```

FIG. 18B

```
                    if(efficiency < eff_min)
                                            efficiency = 0.0;
                                        if(efficiency > eff_max)
                                            efficiency = eff_max;

main_xgas_ptr->bed_m_adsorbed[j] += avg_inlet *
volume_flow_rate * fluid_density * dt * efficiency;
                                        //Get LiOH removal efficiency if the user has
defined a removal factor and decrement
                                        //LiOH mass used for contaminant removal purposes.
                                        if(main_xgas_ptr->lioh_use_factor > 0.0)
                                        {
                                            efficiency2 = Get_LiOH_Removal_Eff(j,
main_xgas_ptr);

if(efficiency2 < eff_min)
                                                efficiency2 = 0.0;
                                            if(efficiency2 > eff_max)
                                                efficiency2 = eff_max;

//                                          main_xgas_ptr->lioh_bed_m_used[j] +=
avg_inlet * volume_flow_rate * fluid_density * dt * efficiency2
//                                                          / main_xgas_ptr->lioh_use_factor;
                                            lioh_mass[j] -= avg_inlet *
volume_flow_rate * fluid_density * dt * efficiency2
                                                            * main_xgas_ptr->lioh_use_factor;

if(lioh_mass[j] <= 0.001 )
                                            {
                                                lioh_mass[j] = 0.0;
                                            }
                                        }
                                        efficiency_sum += (1.0 - efficiency)*(1.0 -
efficiency2);       //Charcoal and LiOH in series }
                                    efficiency = (2.0 - efficiency_sum) / 2.0; //Two
canisters in parallel
```

FIG. 18C

```
                                        avg_outlet = avg_inlet * (1.0 - efficiency);    //
Canister outlet concentration avg_outlet = (avg_inlet*(mass_flow_rate -
2*volume_flow_rate*fluid_density) +
avg_outlet*2*volume_flow_rate*fluid_density)/mass_flow_rate;    //Device
outlet concentration (when considering bypassed flow)

Set_Outlet_XGas( avg_outlet, main_xgas_ptr-
>gasname, efficiency );
                                    } else if(method == 5 || method == 6)     //Radial or
axial charcoal bed
                                    {
                                        if(acid[0] && _stricmp("Ammonia", main_xgas_ptr-
>gasname)==0)
                                        {
                                            efficiency = Get_Acid_Treated_Eff(radial,
main_xgas_ptr->bed_m_adsorbed[0]);
                                        }
                                        else if(chromate[0] && _stricmp("Formaldehyde",
main_xgas_ptr->gasname)==0)
                                        {
                                            efficiency = Get_Chromate_Imp_Eff(radial,
main_xgas_ptr->bed_m_adsorbed[0], volume_flow_rate);
                                        }
                                        else
                                        {
                                            efficiency = Get_Untreated_Eff(radial, 0,
main_xgas_ptr, avg_inlet, inlet_temperature,
                                                    mass_flow_rate, fluid_density,
volume_flow_rate, dt);
                                        } if(efficiency < eff_min)
                                            efficiency = 0.0;
                                        if(efficiency > eff_max)
                                            efficiency = eff_max;
                                        main_xgas_ptr->bed_m_adsorbed[0] += avg_inlet *
mass_flow_rate * dt * efficiency;

avg_outlet = avg_inlet * (1.0 - efficiency);

Set_Outlet_XGas( avg_outlet, main_xgas_ptr->gasname,
efficiency );
```

FIG. 18D

```
                        }
                        else if(method == 7)    //ATCO (Ambient Temperature
Catalytic Oxidizer)
                        {
                                if(_stricmp("Carbon Monoxide", main_xgas_ptr-
>gasname)==0 ||
                                        _stricmp("Hydrogen", main_xgas_ptr-
>gasname)==0)
                                {
                                        efficiency = Get_ATCO_Eff(volume_flow_rate);
                                }
                                else
                                        efficiency = 0.0;

if(efficiency < eff_min)
                                        efficiency = 0.0;
                                if(efficiency > eff_max)
                                        efficiency = eff_max;

avg_outlet = avg_inlet * (1.0 - efficiency);

Set_Outlet_XGas( avg_outlet, main_xgas_ptr-
>gasname, efficiency );
                        }
                        else if(method == 8)    //High Temperature Catalytic Oxidizer
                        {
                                efficiency = Get_Oxidizer_Eff(main_xgas_ptr);

if(efficiency < eff_min)
                                        efficiency = 0.0;
                                if(efficiency > eff_max)
                                        efficiency = eff_max;

if(main_xgas_ptr->category == 6 || main_xgas_ptr-
>category == 7 ||
                                        main_xgas_ptr->category == 12)
                                {
                                        poison_sum += avg_inlet * mass_flow_rate * dt * efficiency;
                                } avg_outlet = avg_inlet * (1.0 - efficiency);

Set_Outlet_XGas( avg_outlet, main_xgas_ptr-
>gasname, efficiency );
                        }
                        else if(method == 9)    //Generic XGas Removal Device
```

FIG. 18E

```
                {
                        if(Get_Generic_Eff(main_xgas_ptr->gasname) != NULL)
                                efficiency =
(Get_Generic_Eff(main_xgas_ptr->gasname))->efficiency;
                        else
                                efficiency = 0.0;

if(efficiency < eff_min)
                                efficiency = 0.0;
                        if(efficiency > eff_max)
                                efficiency = eff_max;

avg_outlet = avg_inlet * (1.0 - efficiency);

Set_Outlet_XGas( avg_outlet, main_xgas_ptr-
>gasname, efficiency );
                } else    //default - set outlet to inlet
                        {
                                Set_Outlet_XGas( avg_inlet, main_xgas_ptr-
>gasname, 0.0 );
                        }
                    }
                } poison_total += poison_sum;    //Store sum of poisons local
variable for time step in scrubber member variable
        }
}
```

FIG. 18F

```
double Air_Scrubber::Get_Untreated_Eff(BOOL radial, int j, XGAS*
main_xgas_ptr, double avg_inlet, double inlet_temperature,
                                              double mass_flow_rate,
double fluid_density, double volume_flow_rate, double dt)
{
        double bed_length = 0.0;
        double bed_weight = 0.0;
        double bed_velocity = 0.0;
        double adsorpt_potential = 0.0;
        double adsorpt_zone_len = 0.0;
        double avail_adsorpt_len = 0.0;
        double len_utilized = 0.0;
        double bed_usage_rate = 0.0;
        double qi = 0.0;
        double efficiency = 0.0;
        double effav = 0.0;
        double eff_beduse = 0.0;
        double prev_effav = 0.0;
        double avg_adsorpt_len = 0.0;
        double pi = 3.14159265359;

if(radial)      //Determine physical characteristics of a radial
charcoal bed (assumes thin bed)
        {
                bed_length = (bedod - bedid)/2.0;       //result - in
                bed_weight =charcoal_density/(2.2046*pow(12.0,3.0))*(pi/4.0)
*(pow(bedod,2.0)-pow(bedid,2.0))*cartridge_length; //2.2046 lb/kg, 12 in/ft, result - kg
                bed_velocity = (volume_flow_rate/60.0)/(pi*((bedod+bedid)/2.0 *
cartridge_length)/144.0);      //V = Q/A, 144 in2/ft2, result - ft/min
        }
        else    //Determine physical characteristics of an axial charcoal bed
        {
                bed_length = cartridge_length;
                bed_weight = charcoal_density/(2.2046*pow(12.0,3.0))*(pi/4.0)
*pow(bedod,2.0)*cartridge_length; //2.2046 lb/kg, 12 in/ft, result - kg
                bed_velocity = (volume_flow_rate/60.0)/((pi/4.0)*pow(bedod,2.0)/
144.0); //V = Q/A, 144 in2/ft2, result - ft/min
        } if(bed_length <= 0.0 || bed_weight <= 0.0 || bed_length <= 0.0) //
ensure non-zero physical parameters
                return 0.0;
```

FIG. 19 adsorpt_potential = ((inlet_temperature - 32)*(5.0/9.0) + 273)/
(main_xgas_ptr->vmol)
        *log10(main_xgas_ptr->vconc/(avg_inlet/
2.2046*1E6*fluid_density/pow(0.3048,3.0)));    //2.2046 lb/kg, 10^6
mg/kg, 0.3048 m/ft, result - Kgmol/cm3

FIG. 20 adsorpt_zone_len = (adsorpt_potential * 0.000275 *
(pow((bed_velocity/1.3),0.8))) / 0.0254; // 0.0254 m/in, result - in qi = Find_QI(adsorpt_potential, main_xgas_ptr->sol); //result - cc
liquid contaminant/gm charcoal bed_usage_rate = coexist*bed_length/(2.2046*main_xgas_ptr-
>dcont*bed_weight*qi); //2.2046 lb/kg, result - in bed consumed/lb
contaminant avail_adsorpt_len = bed_length - main_xgas_ptr-
>bed_m_adsorbed[j]*bed_usage_rate; //result - in bed available;

if(avail_adsorpt_len < 0.0)avail_adsorpt_len = 0.0;
    if((avail_adsorpt_len/adsorpt_zone_len) > 20.0)
        efficiency = eff_max;
    else
    {

FIG. 21

```
                prev_effav = 0.0;
                while(fabs(effav - prev_effav) > 1E-15)
                {
                        len_utilized = avg_inlet * mass_flow_rate * effav * dt
* bed_usage_rate;       // result - in
                        if(len_utilized > avail_adsorpt_len)break;
                        avg_adsorpt_len = avail_adsorpt_len - len_utilized/2.0;
                        if((avg_adsorpt_len/avail_adsorpt_len) >= 20.0)
                        {
                                effav = eff_max;
                                break;
                        }
                        prev_effav = effav;
                        effav = eff_max * (1 - exp(-2.3025851 *
(avg_adsorpt_len/adsorpt_zone_len)));
                } efficiency = effav;

eff_beduse = avail_adsorpt_len/(avg_inlet * mass_flow_rate
* dt * bed_usage_rate);
                if(efficiency > eff_beduse)
                        efficiency = eff_beduse;
        } return efficiency;

THERMAL ANALYSIS SYSTEM

GOVERNMENT LICENSE RIGHTS

This invention was made with Government support under Boeing subcontract 6000132079 awarded by United Space Alliance under prime contract NNJ06VA01C awarded by NASA. The Government has certain rights in this invention.

BACKGROUND INFORMATION

1. Field

The present disclosure relates generally to heat transfer, and in particular to heat transfer in objects. Still more particularly, the present disclosure relates to a method and apparatus of analyzing heat transfer in thermal fluid systems.

2. Background

Older forms of software for analyzing thermal fluid systems have been developed. However, the typical method used to model heat transfer phenomena is the finite differencing method. A difficulty of using the finite differencing method results from the process of breaking down the physical system into a set of differential equations. Often, this level of detail is prohibitive from a computer runtime standpoint. In other words, use of the finite differencing method in real-world models might result in a thermal fluid analysis that requires an undesirable amount of time to perform. Furthermore, in the past, separate tools were used for thermal fluid analysis, pressure drop analysis, and trace contaminant analysis. Thus, a full analysis of a thermal fluid system might be undesirably unwieldy, as well as time intensive and expensive.

As a result, the time and expense increase for designing and manufacturing articles to which the thermal fluid analysis will apply, such as but not limited to buildings or vehicles, especially space vehicles such as the space shuttle. In some cases, the thermal fluid analysis might be considered mandatory, in which case reducing the time, effort, and costs associated with the thermal fluid analysis becomes highly desirable. Accordingly, it would be advantageous to have a method and apparatus, which takes into account one or more of the issues discussed above as well as possibly other issues.

SUMMARY

The advantageous embodiments may provide for a thermal fluid modeling system. A thermal fluid system modeler is provided, including a plurality of individual components. A solution vector is configured from the plurality of individual components and being ordered as a function of one or more inlet dependencies of the plurality of individual components. A fluid flow simulator is adapted to simulate thermal energy being communicated with the flowing fluid and between first and second components of the plurality of individual components. The simulation extends from an initial time to a later time step and bounds heat transfer to be substantially between the flowing fluid, walls of tubes formed in each of the individual components of the plurality, and between adjacent tubes. Component parameters of the solution vector are updated with simulation results for each of the plurality of individual components of the simulation.

The advantageous embodiments may also provide for a method for modeling a thermal fluid system. A thermal fluid system is modeled as a plurality of individual components. A solution vector is configured from the plurality of individual components. The solution vector includes a list of the plurality of individual components in an order of inlet dependency of the plurality of individual components. A flow of fluid is simulated from a first component in the plurality of individual components to a second component in the plurality of individual components. The simulation beginning at an initial time and assuming that tubes in the plurality of individual components are well insulated so that, with respect to the tubes, heat transfers only between the fluid and a given tube wall and between the fluid and between adjacent tubes. Component parameters are updated with simulation results. The flow of fluid simulation is advanced according to a time step. The flow of fluid is re-simulated from the first component to the second component and re-updating the component parameters.

The advantageous embodiments may also contemplate a computer processing means adapted to carry out a method such as that provided above. The advantageous embodiments may also contemplate a method of manufacturing including the method provided above, with the additional operations of producing and storing a result of the simulation and performing one of manufacturing or modification of one of a vehicle and a building using the thermal fluid model. Other advantageous embodiments are also contemplated as provided elsewhere herein.

The features, functions, and advantages can be achieved independently in various advantageous embodiments of the present disclosure or may be combined in yet other advantageous embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIGS. 11 through 22 are illustrations of pseudo code for how to encode an XGas propagation theory in the advantageous embodiments described herein, in accordance with an advantageous embodiment.

DETAILED DESCRIPTION

Figure 1:
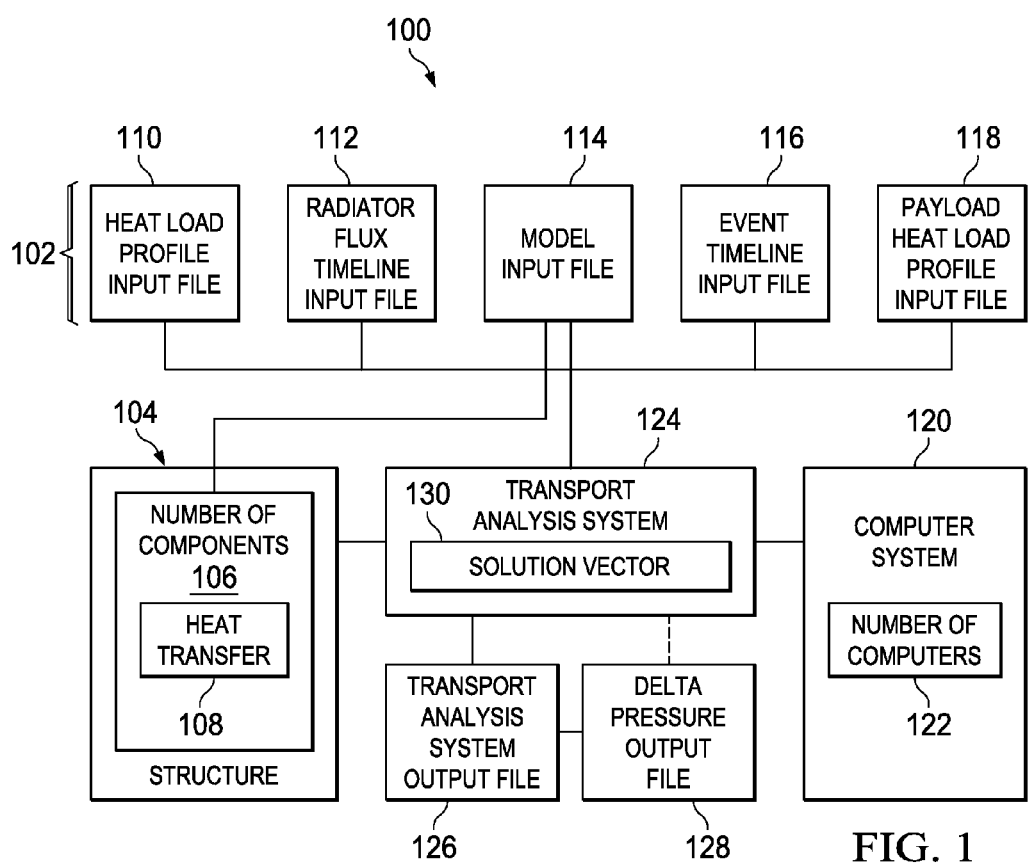
FIG. 1 is an illustration of a block diagram of a thermal fluid analysis system environment in which an advantageous embodiment may be implemented.

As mentioned above, the typical method used to model heat transfer phenomena is the finite differencing method. This method begins with breaking the physical system down into elements from which a set of energy balance differential equations can be written. A differential approximation method is then applied to the system of equations to yield a set of differencing equations.

The difficulty in using a finite differencing scheme is in the process of breaking down the physical system into a set of differential equations. This process is straightforward for active thermal elements such as tubes, but for more complex elements, such as heat exchangers, radiators, flash evaporators, and like components, the nodalization process may yield very large and complex sets of differential equations. Often, this level of detail is prohibitive from a computer runtime standpoint.

For this reason, the advantageous embodiments described herein might not use the finite differencing method. Instead, the advantageous embodiments described herein may assume that the tubes in the system are well insulated so that only the heat transfer between the fluid and tube wall and between adjacent tubes is modeled. The system described in the model file may be broken down into its individual components, which might be tubes, cold plates, heat exchangers, and other components of a thermal system. A solution vector may be built from the components and flow may then be simulated with fluid being transferred from one component to the next. The solution vector of components in the model file may be built at the initiation of the run. This solution vector may be a list of components in the order of their inlet dependency on other components. The component parameters may be updated in the order in which they appear in the list at every time step.

As a result of this analysis, an approximation of the behavior of the thermal fluid system may be output for storage or for review by a user. In the case of a vehicle, such as the space shuttle, an approximate model may be created regarding how heated air flows through the various compartments of the space shuttle. The model may be used to determine whether thermal fluid flow may be considered acceptable, or whether changing the design of the closed thermal system might be desirable. Because this analysis may be performed quickly and efficiently using the advantageous embodiments described herein, the advantageous embodiments may substantially reduce the time, expense, and complexity of designing and manufacturing closed thermal fluid systems, such as but not limited to the space shuttle.

Similar models may be generated for other vehicles and also for buildings. Examples of other vehicles to which the advantageous models might apply could be other space vehicles such as but not limited to low earth orbit vehicles, re-entry vehicles, interplanetary vehicles, and interstellar vehicles. The advantageous embodiments may also apply to terrestrial vehicles such as but not limited to aircraft, automobiles, tanks, busses, marine vehicles such as but not limited to ships or boats, or any other vehicle. Examples of buildings to which the advantageous models may be applied include terrestrial buildings including but not limited to houses, office buildings, skyscrapers, and others, as well as buildings intended for use in outer space, such as but not limited to space stations, lunar modules, or any other kind of extraterrestrial habitat. The advantageous embodiments might also be applied to vehicles, buildings, or other thermal systems whether or not the vehicle, building, or other thermal system is a closed thermal system.

The models that may be generated using the advantageous embodiments may be used in the manufacturing of any of the above vehicles or buildings. Thus, for example, a building or a vehicle may be built based on, at least in part, designs that are generated according to the thermal models described herein. Thus, a vehicle or a building may be considered an advantageous embodiment of the systems described herein. Additionally, while the advantageous embodiments may be described as a computer program, the advantageous embodiments may also take a physical form in terms of both a purely hardware embodiment or a physical manufactured object.

FIG. 1 is an illustration of a block diagram of a thermal fluid analysis system environment in which an advantageous embodiment may be implemented. The thermal fluid system analysis environment 100 shown in FIG. 1 may be implemented as or in one or more data processing systems, such as those shown in FIG. 2. Thermal fluid system analysis environment 100 may include a number of inputs 102 to be used in a thermal analysis of structure 104. Structure 104 may include number of components 106 through which heat transfer 108 may occur via a thermal fluid. The "number of components" may be all or some of the components.

As used herein, a number of items means one or more items. For example, a number of components 106 may be one or more components. Number of components 106 may include, for example, at least one of, tubes, pipes, heat exchangers, cold plates, radiators, and other suitable components.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In an illustrative example, number of inputs 102 includes heat load profile input file 110, radiator flux timeline input file 112, model input file 114, event timeline input file 116, and payload heat load profile input file 118. Other inputs may be provided to thermal fluid system analysis environment 100. Thermal fluid system analysis environment 100 may include computer system 120. Computer system 120 may have a number of computers 122. Thermal fluid system analysis environment 100 may run on number of computers 122 in computer system 120.

In these examples, thermal fluid system analysis environment 100 may be implemented in program code or as a system or as hardware. Thermal fluid system analysis environment may include Transport Analysis System (TAS) 124. While the advantageous embodiments may describe the thermal fluid analysis system as computer readable code, in other advantageous embodiments the TAS 124 may also be embodied in a purely hardware embodiment or as some other system. Thermal fluid system analysis environment 100 may also include an arrangement of compartment spaces, tubes, splits, pumps, and other components through which a fluid might flow. Number of inputs 102 may be provided to or retrieved by TAS 124. TAS 124 may perform a variety of calculations, described further herein, to produce TAS output file 126. TAS output file 126 may be a description of how heat in a fluid, such as air, flows and behaves in a given environment which had been input into TAS 124. The TAS output file 126 may include temperatures, flow rates, pressures, delta pressures, tank quantities, and gas quantities in the air, along with air scrubbing component performance.

In another advantageous embodiment TAS 124 may also produce a delta pressure output file 128. The delta pressure output file 128 may describe changes in fluid pressure in different components through which the fluid flows.

In an advantageous embodiment, the TAS 124 may be C++ software that is used for analysis of thermal fluid systems. TAS's solution process may assume that the tubes in the system are well insulated so that only the heat transfer between fluid and tube wall and between adjacent tubes is modeled. The system described in the model input file 114 may be for structure 104. Model input file 114 may be broken down into number of components 106 for structure 104. Solution vector 130 may be built from number of components 106 in model input file 114. This solution vector 130 may be a list of components in the order of their inlet dependency on other components. Heat transfer 108 in structure 104 may then be simulated with fluid being transferred from one component to the next over a number of time steps.

Solution vector 130 for number of components 106 in the model input file 114 may be built at the initiation of the execution of the TAS 124. Parameters for number of components 106 may be updated in the order in which they appear in the list at every time step.

The model may also include computing the largest time step usable with the defined inputs to simulate flow through the system as the flow reacts to other defined inputs on the system being modeled. The solution vector 130 and the model may allow TAS 124 to compute, through multiple quick iterations for the time period of the run, multiple output parameters used for analysis for every part of the defined system in a few minutes, even for analysis of time periods of three to four hundred hours of thermal fluid flow time, as opposed to multiple hours using other techniques.

Once the solution vector 130 has been determined, TAS 124 may cycle through the components in the solution vector, executing their outlet function for each time step increment. In this manner, TAS 124 may predict thermal fluid system and component transients.

As mentioned above, in the past separate tools were used for thermal fluid analysis, pressure drop analysis, and trace contaminant analysis. TAS 124 provides a single tool capable of performing all of these jobs, using the solution vector to obtain the output relatively quickly. This solution represents an improvement over known thermal fluid analysis systems in that a single tool may be used to perform a comprehensive analysis substantially more quickly than even a partial analysis performed by a prior system.

The illustration of thermal fluid system analysis environment 100 in FIG. 1 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 2:
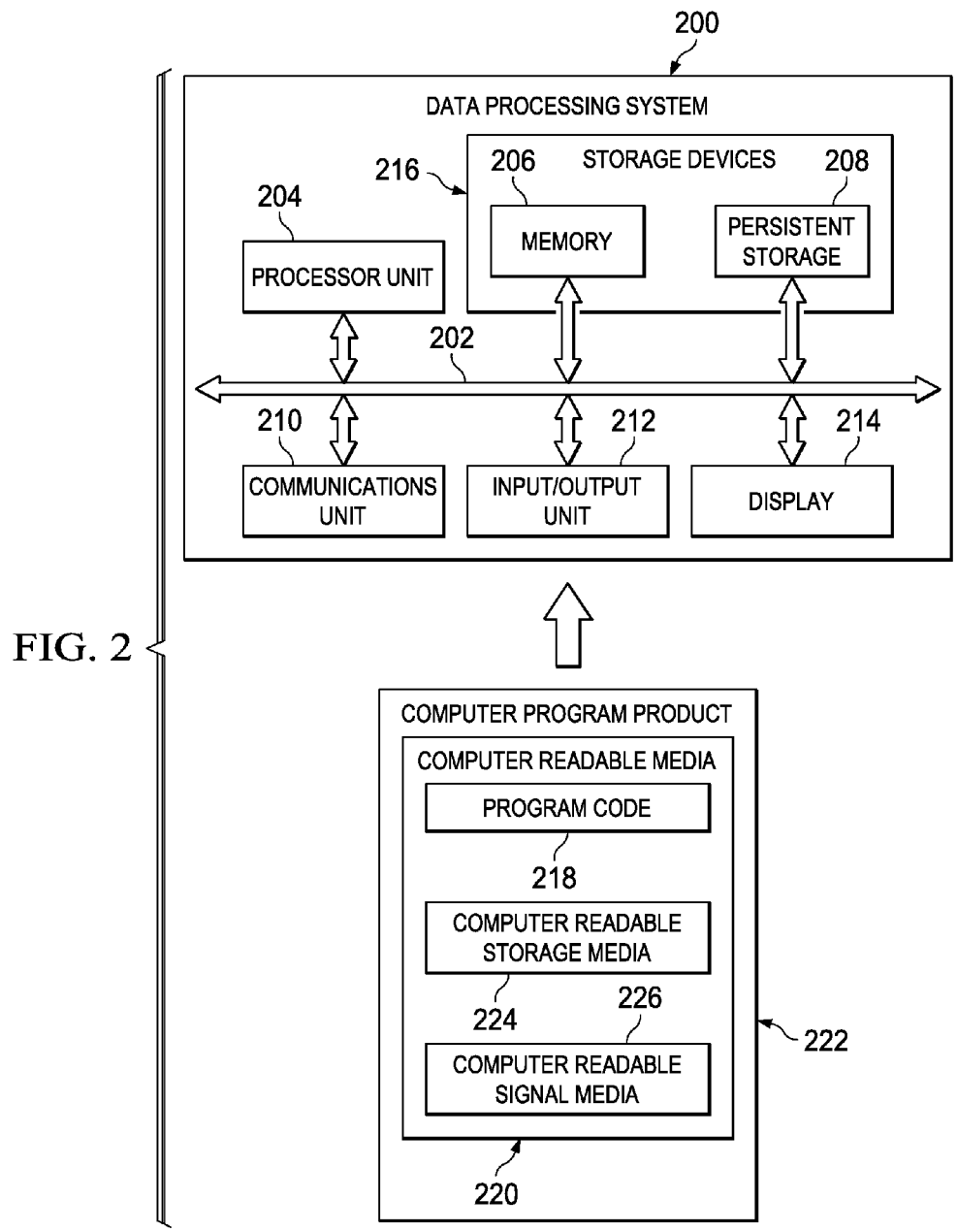
FIG. 2 is an illustration of a block diagram of a data processing environment in which the advantageous embodiments may be implemented.

Turning now to FIG. 2, an illustration of a data processing system is depicted in accordance with an advantageous embodiment. Some, part, or all of the components shown in FIG. 2 may be considered computer processing means or data processing means. Data processing system 200 in FIG. 2 is an example of a data processing system that may be used to implement computers in computer system 120 in FIG. 1, or which may physically embody the advantageous embodiments described herein. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

Persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different advantageous embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different advantageous embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form a computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory drive, that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different advantageous embodiments may be implemented. The different advantageous embodiments may be implemented in a data processing system including components in addition to or in place of those illustrated for data processing system 200. Other components shown in FIG. 2 can be varied from the illustrative examples shown. The different advantageous embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, a programmable logic array, a field programmable logic array, a field programmable gate array, and other suitable hardware devices. With this type of implementation, program code 218 may be omitted because the processes for the different advantageous embodiments are implemented in a hardware unit.

In still another illustrative example, processor unit 404 may be implemented using a combination of processors found in computers and hardware units. Processor unit 404 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
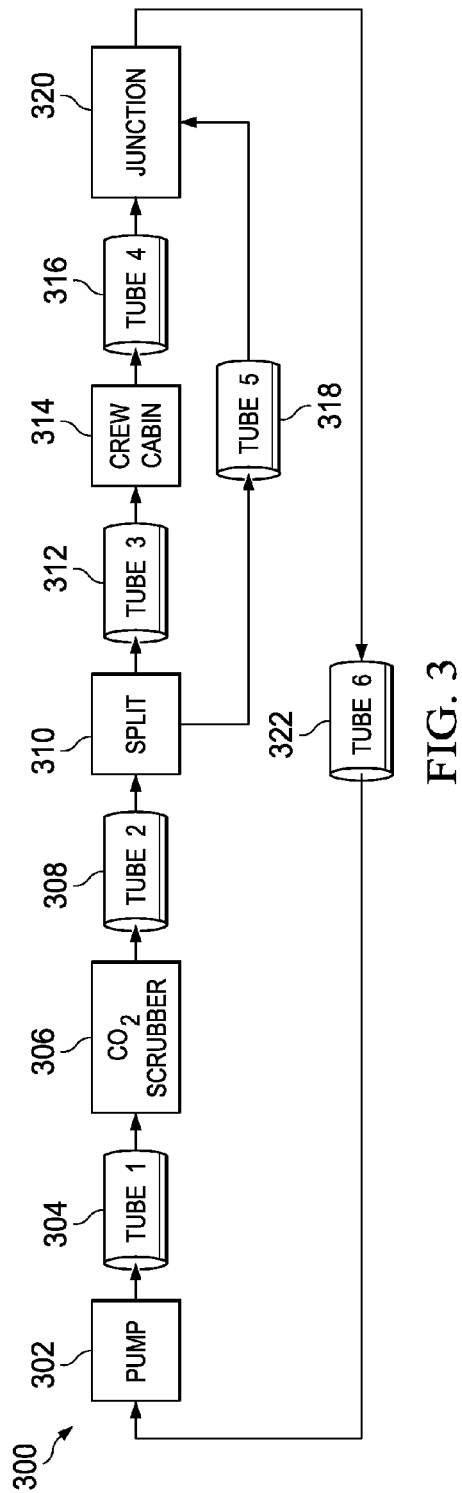
FIG. 3 is an illustration of a block diagram of a small system loop depicted in accordance with an advantageous embodiment.

FIG. 3 is an illustration of a block diagram of a small system loop depicted in accordance with an advantageous embodiment. Small system loop 300 may be an arrangement of components through which a fluid flows, and may be considered a possible input for use in a TAS, such as TAS 124 in FIG. 1. Small system loop 300 might form part of a model input file, such as model input file 114 in FIG. 1.

In the non-limiting advantageous embodiment shown in FIG. 3, small system loop 300 includes a number of components arranged as shown. In particular, pump 302 pumps fluid through tube one 304 to carbon dioxide scrubber 306. In turn, fluid flows from carbon dioxide scrubber 306 through tube two 308 to split 310. The fluid then flows from split 310 through tube three 312 and tube five 318. The fluid flows from tube three 312 to crew cabin 314 through tube 4 316 and then to junction 320. The fluid also flows from split 310 through tube five 318 straight to junction 320. From junction 320, the fluid flows through tube 6 322 back to pump 302.

In one advantageous embodiment, TAS 124 in FIG. 1 might not use finite differencing. Instead, the TAS 124 solution process may assume that the tubes in the system are well insulated so that only the heat transfer between the fluid and tube wall and between adjacent tubes is modeled. The system described in the model file, such as model input file 114 in FIG. 1, is broken down into its individual components such as tubes, cold plates, heat exchangers, and others. A solution vector may be built from the components, and flow may then be simulated with fluid being transferred from one component to the next.

The solution vector of components in the model file may be built at the initiation of execution of the TAS 124 in FIG. 1. This solution vector may be a list of components in the order of their inlet dependency on other components. The component parameters may be updated in the order in which they appear in the list at every time step. Small system loop 300 may be used to illustrate how such a solution vector might be built. The solution vector for the small system loop 300 could be as follows: 1. pump; 2. tube 1; 3. $CO_2$ scrubber; 4. tube 2; 5. split; 6. tube 5; 7. tube 3; 8. crew cabin; 9. tube 4; 10. junction; and 11. tube 6.

In this solution vector, after tube 5 (operation 6) the junction of the model (operation 10) may not have all the necessary information to be processed. For example, the junction of the model might need a valid solution from tube 4 (operation 9). In this case, the solution routine used in the TAS 124 in FIG. 1 may be a recursive function. This recursive function may call itself in the split (operation 5) and upon reaching the junction (operation 10), may return to the split to process the remaining components: tube 3 (operation 7), crew cabin (operation 8), and tube 4 (operation 9). In this manner, all the information needed to process the junction may be included.

Figure 4:
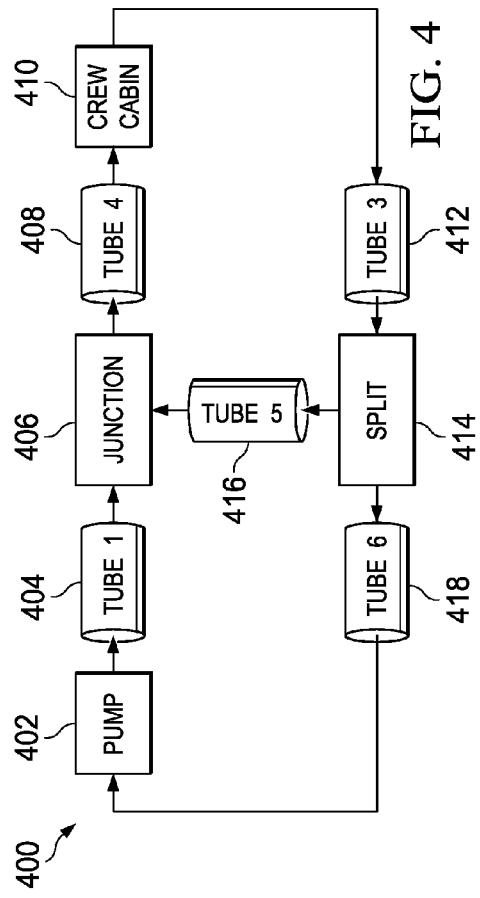
FIG. 4 is an illustration of a block diagram of an internal loop depicted in accordance with an advantageous embodiment.

FIG. 4 is an illustration of a block diagram of an internal loop depicted in accordance with an advantageous embodiment. Internal loop 400 may be an arrangement of components through which a fluid flows, and may be considered a possible input for use in a TAS, such as TAS 124 in FIG. 1. Internal loop 400 might form part of a model input file, such as model input file 114 in FIG. 1.

The process of determining a solution vector described in FIG. 3 might possibly assume that there is a pump in each major loop, such as an air loop, Freon loop, or other loop. The description of internal loop 400 addresses this possibility.

In the non-limiting advantageous embodiment of FIG. 4, internal loop 400 includes a number of components arranged as shown. In particular, pump 402 forces fluid through tube one 404 to junction 406. Fluid flows from tube four 408 to crew cabin 410. In turn, fluid flows from crew cabin 410 through tube three 412 to split 414. Fluid flows from split 414 through both tube five 416 and tube six 418. Fluid through tube five 416 flows to junction 406, whereas fluid through tube six 418 flows back to pump 402.

The solution vector determination process described in FIG. 3 might not work for the internal loop 400 shown in FIG. 4. Internal loop 400 might require iteration, which may be possible in TAS 124 in FIG. 1 through the use of a crew cabin to form the resulting split from the internal loop. Thus, this situation may cause an infinite looping process within the solution vector determination process. In turn, the infinite looping process might result in the premature termination of the TAS run. However, if the split component is replaced with a crew cabin component, TAS 124 in FIG. 1 can complete the solution vector and avoid premature termination. Note that two loops can interface with each other through heat exchangers, as in the example shown in FIG. 5.

Figure 5:
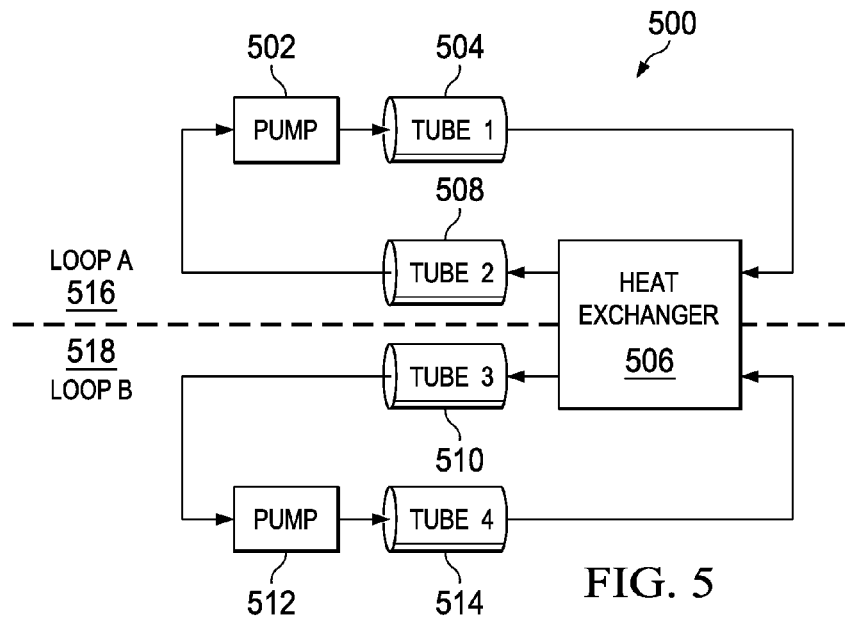
FIG. 5 is an illustration of a block diagram of a multi-loop depicted in accordance with an advantageous embodiment.

FIG. 5 is an illustration of a block diagram of a multi-loop depicted in accordance with an advantageous embodiment. Multi-loop 500 may be an arrangement of components through which a fluid flows, and may be considered a possible input for use in a TAS, such as TAS 124 in FIG. 1. Multi-loop 500 might form part of a model input file, such as model input file 114 in FIG. 1.

In the non-limiting advantageous embodiment shown in FIG. 5, multi-loop 500 includes a number of components arranged as shown. In particular, pump 502 forces fluid through tube one 504 to heat exchanger 506. Fluid flows from heat exchanger 506 through tube two 508 back to pump 502. However, the fluid also flows from heat exchanger 506 through tube three 510 to pump 512. Pump 512 forces fluid through tube four 514 back to heat exchanger 506. Pump 502, tube one 504, heat exchanger 506, and tube two 508 may be considered to form "loop A" 516. Likewise, components tube three 510, pump 512, and tube four 514 may be considered to form "loop B" 518.

In the non-limiting advantageous embodiment of FIG. 5, if the solution vector determination process for loop A 516 is started first, TAS 124 in FIG. 1 may recognize that the solution for tube 4 has not been solved for when the fluid reaches the heat exchanger 506. At this point, the solution process for loop A 516 may be suspended. However, the solution process for loop B 518 may be started and completed because the heat exchanger's loop A 516 side has been solved for one or more components in loop A 516, such as tube one 504. Once processing for loop B 518 is completed, the solution process for loop A 516 may be resumed, at the point it was suspended, and completed.

At the initiation of execution, TAS 124 in FIG. 1 may automatically determine the appropriate time step to be used during processing. In an advantageous embodiment, the appropriate time step may be the largest time step, though any particular time step might be considered the "appropriate" time step in other advantageous embodiments. In the case of the "largest time step," the "largest" time step may be the time used to displace the volume of fluid in the largest mainline tube. All the loops in an input model file may be investigated to find the largest mainline tube. The largest mainline tube may be used because the amount of fluid passed through the mainline tube in one time step is equal to or less than its volume, thereby guaranteeing that all the fluid is accounted.

TAS 124 in FIG. 1 may execute using the model, and as a result may produce an output file after each loop's solution vector is found. The components in the solution vector may have an outlet function that computes all of the outlet parameters associated with each component at a given time. Once the solution vectors have been determined, TAS 124 in FIG. 1 may cycle through the components in the solution vector, executing their outlet function for each time step increment.

Figure 6:
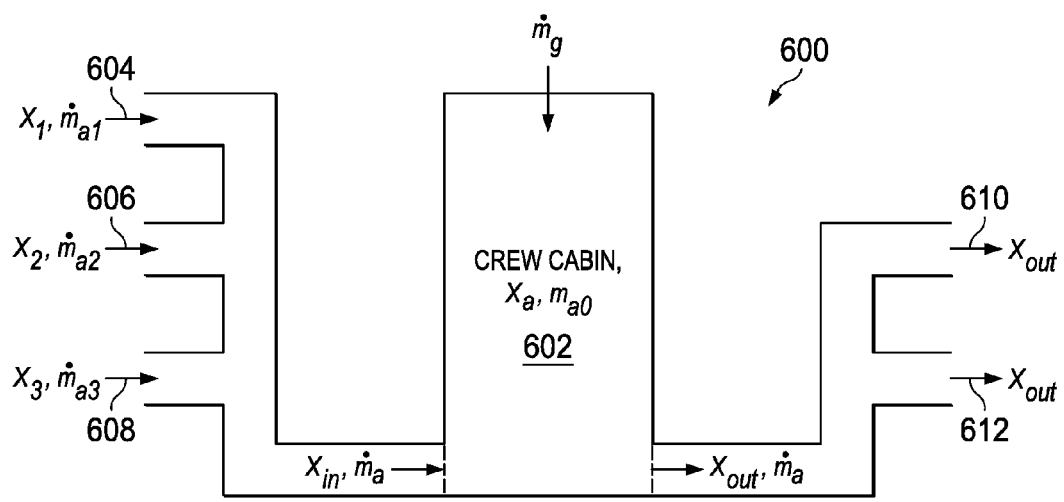
FIG. 6 is an illustration of a diagram demonstrating XGas propagation theory depicted in accordance with an advantageous embodiment.

FIG. 6 is an illustration of a diagram demonstrating XGas propagation theory depicted in accordance with an advantageous embodiment. In an advantageous embodiment, FIG. 6 demonstrates the physical assumptions operating in an XGas concentration calculation. This theory may be included in a model input file, such as model input file 114 in FIG. 1. This theory may be taken into consideration when calculating solution vectors, such as those described with respect to FIGS. 3-5.

In an advantageous embodiment, trace contaminant (XGas) simulation may be modeled in the TAS 124 of FIG. 1 by integrating the physics of trace contaminant mixing and removal with the physical properties of each TAS model element and the TAS solution methods described above. In this manner, TAS 124 of FIG. 1 provides for a single tool capable of simultaneously performing an XGas simulation together with a thermal fluid analysis, such as the thermal fluid analyses described with respect to FIGS. 3-5.

In a like manner, TAS 124 of FIG. 1 may also integrate other factors with the generated solution vectors described above, with the other factors including but not limited to thermal fluid analysis, pressure drop analysis, and others.

This integrated analysis ability of TAS 124 of FIG. 1 thereby presents a single tool for analyzing multiple considerations simultaneously and quickly. These functions of TAS 124 of FIG. 1 stand in contrast to prior thermal fluid analysis systems, in which separate tools were used to perform analyses of these different factors, each of which were slower due to the use of many differential equations.

The TAS solution method, which may assume small movements of fluid elements over small, discrete time steps, may provide for quick, accurate transient and steady-state analyses of trace contaminant concentrations and propagation rates using uniform mixing assumptions. Solutions to contaminant bulk concentration problems may be arrived at in times far less than those used by computational fluid dynamics (CFD) solvers. In addition to contaminant introduction routines, the XGas module may use known trace contaminant hardware scrubbing efficiencies and also integrate these routines in the solution method. Removal efficiencies may be calculated for each contaminant scrubber at each time step and applied to the bulk concentration calculation for the element.

This approach allows for tracking of varying contaminant concentrations for any modeling element at any model time. Furthermore, as the TAS model input is text-based and event-driven, this approach also allows for convenient user-modification of all parameters pertaining to contaminant introduction and removal, as well as more effective modeling of series of events, compared to similar standalone programs.

XGas concentrations may equalize between each TAS modeling element, or heat transfer element (HTE), in a gas loop and move from areas of high concentration to areas of low concentration. XGases may be assumed to be trace in their nature and do not make any thermal or pressure contributions to the working fluid. Time-dependent transfer may be simulated by assuming small movements of gases at small, discrete time steps. XGases may be assumed to mix completely with the working fluid during each time step. The rate of XGas transfer between HTEs is dependent on the mass-based concentration of each XGas in the HTE, the working fluid's flow rate, and the volume of each HTE, if applicable. FIG. 6 demonstrates the physical assumptions operating in XGas concentration calculation.

The TAS 124 of FIG. 1 may contain several routines to simulate atmospheric scrubbing of trace contaminants. The contaminant concentration for a given volume may be calculated based on the device configuration, contaminant generation rate, contaminant removal rate, removal device efficiency, and other specific information relevant to that time increment. In an advantageous embodiment, small time increments may yield the most accurate solution for a given simulation. However, due to possible computer processing limits, a larger time increment may be used in conjunction with a Newton-Raphson convergence routine to reduce computer runtime when calculating a solution. TAS may improve on this calculation speed by utilizing not only current PC processing speeds, but also the sufficiently small time-step of the TAS solution method. For example, using just the single TAS 124 of FIG. 1 to perform such a simulation, about 10 seconds might be used to model the current space shuttle, whereas several minutes or hours may be required for prior systems to perform the same analysis through the inconvenient use of multiple software tools.

Routines for calculating contaminant removal efficiencies for several common spacecraft scrubbing devices, such as granularly-activated charcoal, catalytic oxidizers, condensing heat exchangers, and others, may be included in the TAS. In general, all of the routines calculate an XGas removal efficiency based on factors such as contaminant physical properties, inlet concentrations, mass of contaminants previously removed, flow rate, temperature, device geometries, and possibly other factors. XGas outlet concentrations for each HTE at each time step may be calculated based on this efficiency. As with XGas introduction routines, all aspects of scrubber device performance may be controlled on a per-event basis via the text-based TAS inputs 102 in FIG. 1.

Turning again to the non-limiting advantageous embodiment of FIG. 6, gas flow system 600 illustrates XGas flow through crew cabin 602. Input one 604 represents XGas inlet concentration $X_1$ of a first XGas. Input two 606 represents XGas inlet concentration $X_2$ of a second XGas. Input three 608 represents XGas inlet concentration $X_3$ of a third XGas. In each case, the terms $m_{a1}$, $m_{a2}$, and $m_{a3}$, represent the corresponding inlet air mass flow rate. Together, input one 604, input two 606, and input three 608 form the total XGas cabin inlet concentration $X_{in}$ at total flow rate $m_a$. Crew cabin 602 begins at an initial XGas cabin concentration, $X_0$ and total cabin air mass, $m_{a0}$. $m_g$ Represents the XGas introduction rate. Output one 610 and output two 612 represent the total XGas outlet concentration, $X_{out}$.

In this case, the total $X_{in}$ may be evaluated according to the equation:

$$X_{in}=(X_1*m_{a1}+X_2*m_{a2}+X_3*m_{a3})/m_a$$

The XGas mass entering is $X_{in}*m_a*dt$. The XGas mass leaving is $X_o*m_a*dt$. The initial XGas mass is $X_o*m_{a0}$. The XGas mass added is $m_g*dt$. The new cabin XGas mass may be $X_{out}*m_{a0}$. These values may be related according to the equation:

$$X_{in}*m_a*dt+X_o*m_a*dt+X_o*m_{a0}+m_g*dt=X_{out}*m_{a0}.$$

This equation may be solved for $X_{out}$, and all crew cabin outlet concentrations may be set to this value.

Applicable program code or a hardware configuration for XGas removal may be found in FIGS. 11-22. The code described herein is an example only, and other code and different inputs might be used.

Figure 7:
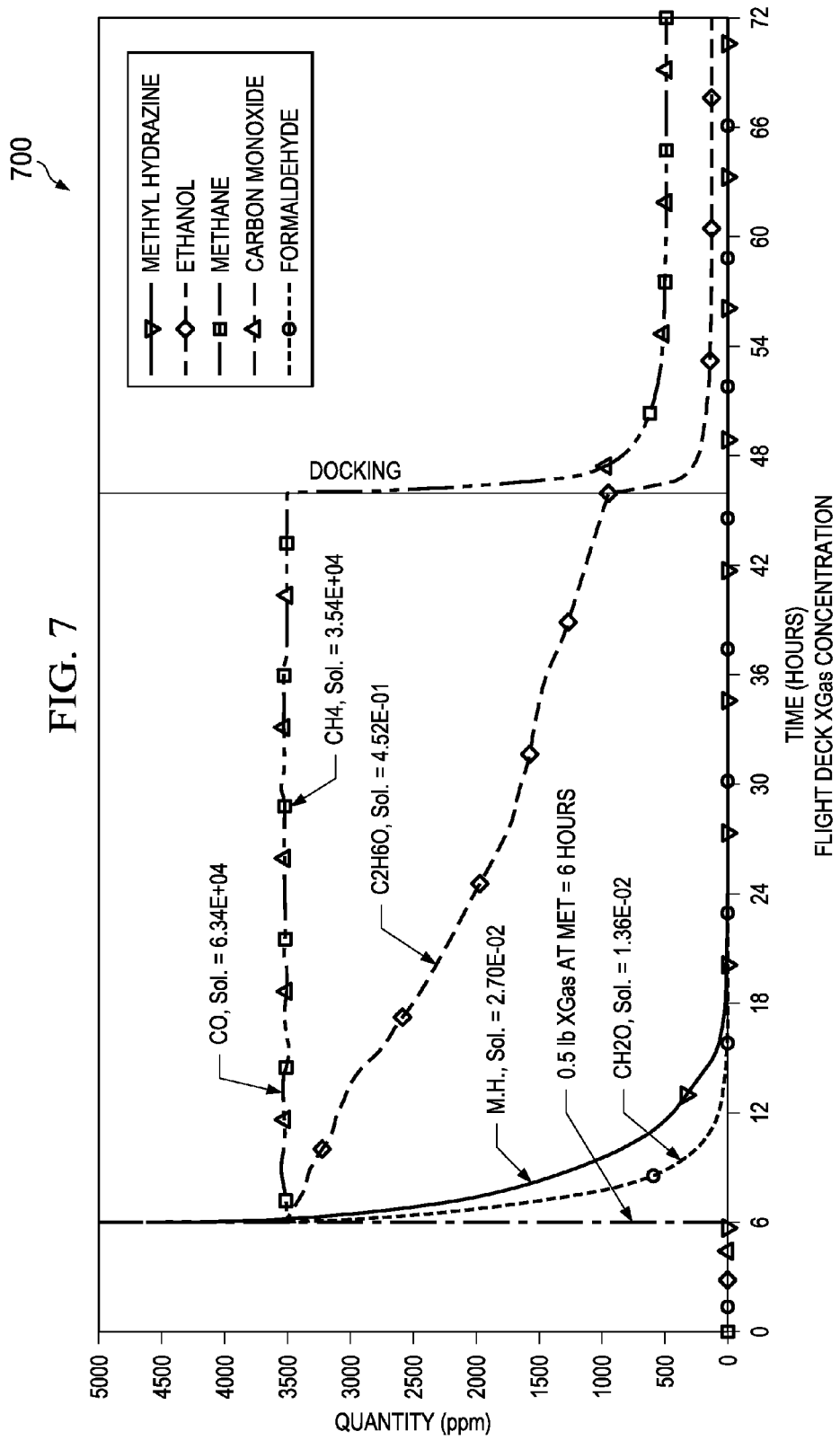
FIG. 7 is an illustration of a graph of non-limiting output of a thermal fluid analysis system performed according to the techniques described herein depicted in accordance with an advantageous embodiment.

FIG. 7 is an illustration of a graph of non-limiting output of a thermal fluid analysis system performed according to the techniques described herein depicted in accordance with an advantageous embodiment. Graph 700 shows flight deck XGas concentration to quantity in parts per million for a model performed for the space shuttle. Graph 700 represents one possible output after executing TAS 124 of FIG. 1, for which five different XGas contaminants were introduced into the orbiter. TAS modeled the effectiveness of the cabin heat exchanger in removing the contaminants for the duration of a mission.

Figure 8:
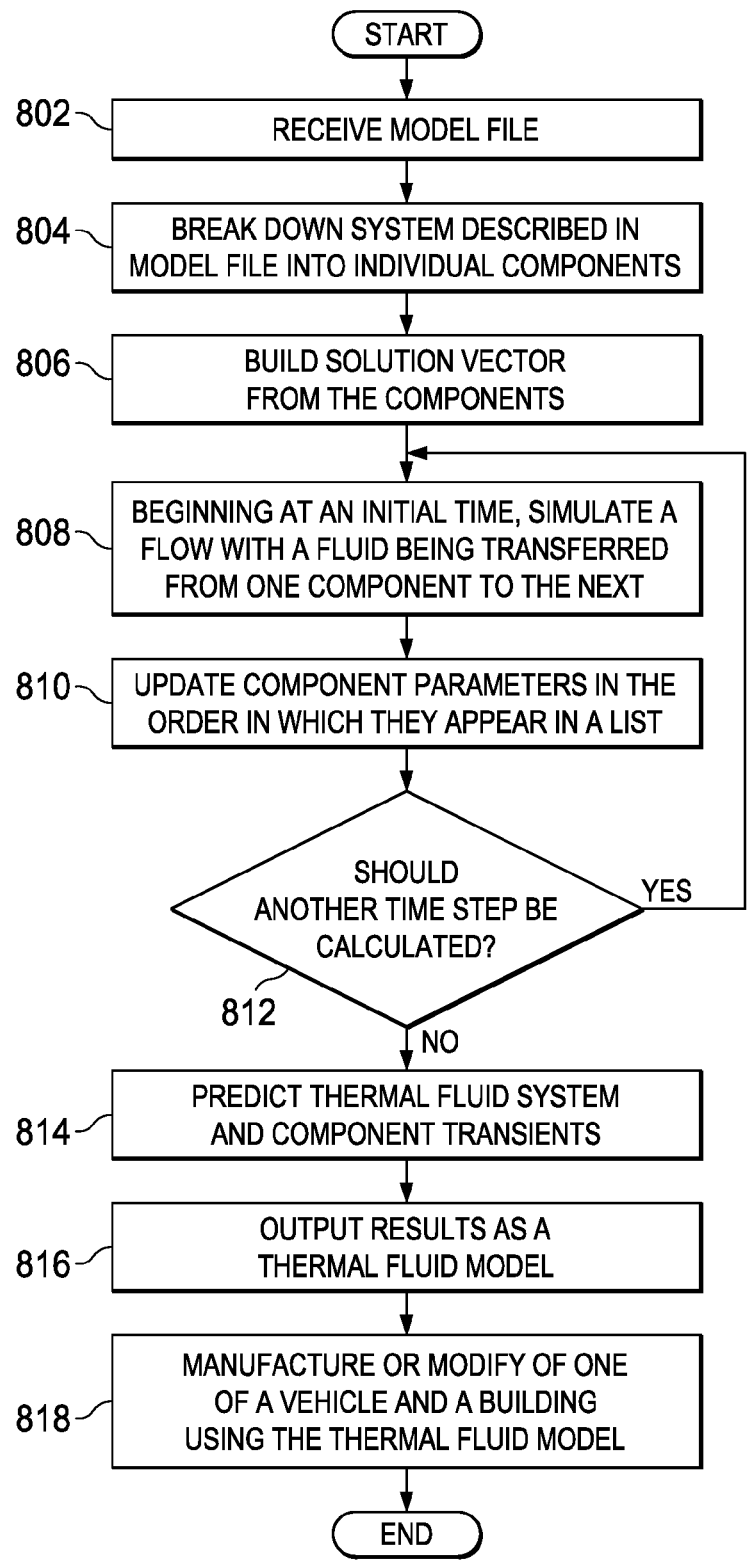
FIG. 8 is an illustration of a flowchart illustrating a process of performing a thermal fluid analysis depicted in accordance with an advantageous embodiment.

FIG. 8 is an illustration of a flowchart illustrating a process of performing a thermal fluid analysis and a manufacturing method depicted in accordance with an advantageous embodiment. The flow shown in FIG. 8 may be implemented in thermal fluid analysis system environment 100 in FIG. 1, as well as in one or more computers such as those shown in FIG. 2. The flow shown in FIG. 8 may be implemented with regard to the models shown in FIG. 3-5 or 9, and further may include the XGas theory shown in FIG. 6, and may have an output such as that shown in FIG. 7.

The process begins as TAS receives a model file (operation 802). The TAS then breaks down the system described in the model file into individual components (operation 804). The TAS then builds a solution vector from the components (operation 806). Examples of solution vectors are described above in FIGS. 3-5.

The TAS then, beginning at an initial time, simulates flow with fluid being transferred from one component to the next (operation 808). The TAS updates component parameters in the order in which they appear in a list (operation 810).

The TAS then determines whether another time step should be calculated (operation 812). If the determination at operation 812 is "yes," then the TAS returns to operation 808 and the process repeats. If the determination at operation 812 is "no," then the TAS predicts thermal fluid system and component transients (operation 814). The TAS outputs the results as a thermal fluid model (operation 816). Optionally, in the case of a method of manufacture, the method may further include manufacturing or modifying of one of a vehicle and a building using the thermal fluid model (operation 818). The process terminates thereafter.

The flowcharts and block diagrams in the different depicted advantageous embodiments illustrate the architecture, functionality, and operation of some possible implementations of apparatus and methods in different advantageous embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Figure 9:
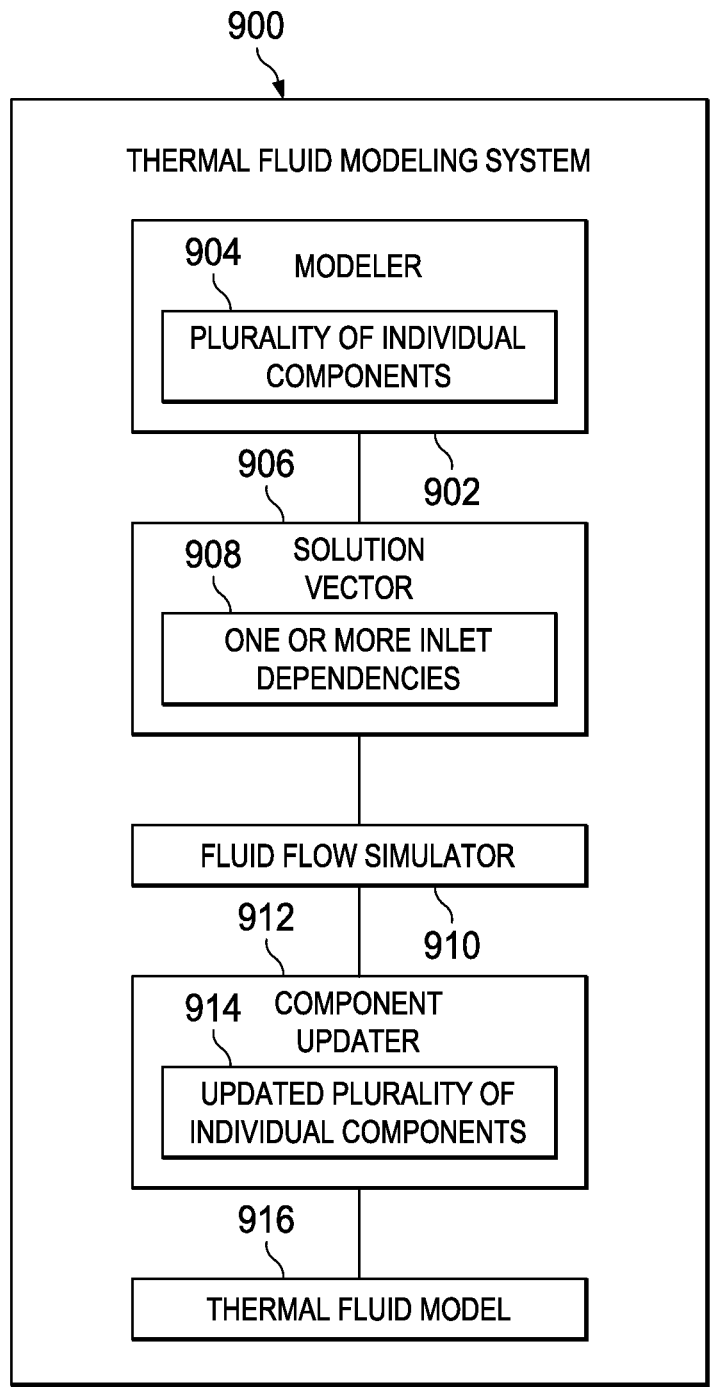
FIG. 9 is an illustration of a block diagram of a thermal fluid system modeler depicted in accordance with an advantageous embodiment.

FIG. 9 is an illustration of a block diagram of a thermal fluid system modeler depicted in accordance with an advantageous embodiment. The thermal fluid modeling system 900 shown in FIG. 9 may be implemented as or in one or more data processing systems, such as those shown in FIG. 2. Thermal fluid modeling system 900 may include a modeler 902 which includes a plurality of individual components 904, such as the solution vector 130 and number of components 106 described above with respect to FIG. 1.

Thermal fluid modeling system 900 may also include a solution vector 906 configured from the plurality of individual components. The plurality of individual components 904 may be ordered as a function of one or more inlet dependencies 908.

Fluid flow simulator 910 may be adapted to simulate thermal energy being communicated with the flowing fluid and between first and second components of the plurality of individual components 904. The simulation may extend from an initial time to a later time step and may bound heat transfer to be substantially between the flowing fluid, walls of tubes formed in each of the individual components of the plurality, and between adjacent tubes. Thermal fluid modeling system 900 may also include a component updater 912 configured to update component parameters of the solution vector 906 with simulation results for each of the plurality of individual components 904 of the simulation. As a result, an updated plurality of individual components 914 may be obtained. In the end a thermal fluid model 916 may be the result of the operation of thermal fluid modeling system 900.

Figure 10:
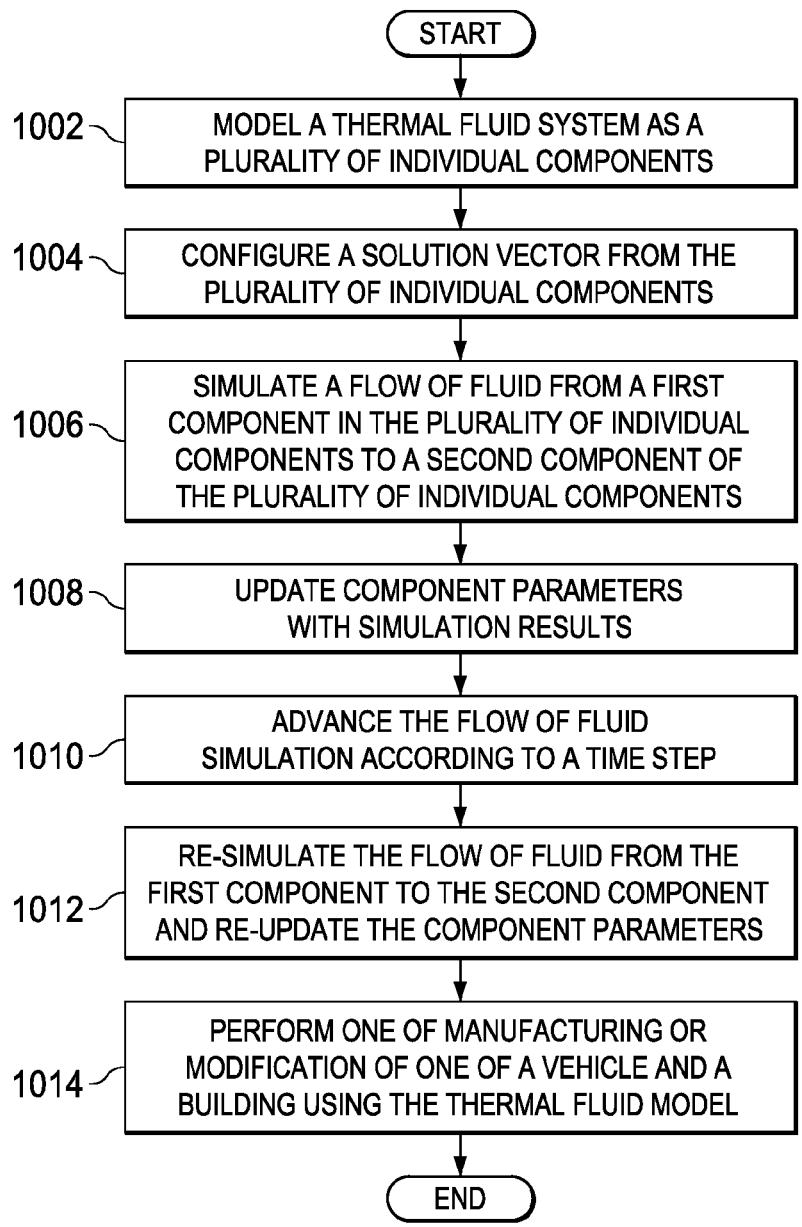
FIG. 10 is an illustration of a flowchart illustrating a process of performing a thermal fluid analysis depicted in accordance with an advantageous embodiment.

FIG. 10 is an illustration of a flowchart illustrating a process of performing a thermal fluid analysis depicted in accordance with an advantageous embodiment. The flow shown in FIG. 10 may be implemented in thermal fluid analysis system environment 100 in FIG. 1, or thermal fluid modeling system 900, as well as in one or more computers such as those shown in FIG. 2. The flow shown in FIG. 10 may be implemented with regard to the models shown in FIGS. 3-5 or FIG. 9.

The process begins with modeling a thermal fluid system as a plurality of individual components (operation 1002). A solution vector is configured from the plurality of individual components (operation 1004). A flow of fluid is simulated from a first component in the plurality of individual components to a second component in the plurality of individual components (operation 1006). The component parameters are updated with simulation results (operation 1008). The flow of fluid simulation is advanced according to a time step (operation 1010). The flow of fluid is re-simulated from the first component to the second component and the component parameters are re-updated (operation 1012). The result of the flow to this point may be a thermal fluid model. Optionally, when building objects, one of manufacturing or modification may be performed with respect to one of a vehicle and a building using the thermal fluid model (operation 1014). The process terminates thereafter.

FIGS. 11 through 22 are illustrations of pseudo code for how to encode an XGas propagation theory in the advantageous embodiments described herein, in accordance with an advantageous embodiment. The pseudo code shown may be considered an example of how to encode the processes described with respect to FIG. 6. This pseudo code is a non-limiting example, as other code could be generated depending on a particular implementation. Furthermore, TAS may incorporate both the following pseudo code, as well code for many other routines and subroutines in order to facilitate modeling of many simultaneous considerations.

FIG. 11 illustrates pseudo code for a function to calculate and set new concentrations of XGasses in HTE based on inlet concentration, outlet concentration, dt, total mass of air, total air mass for the previous calculation, mass flow rate of air, and rate or amount of introduced gas. FIG. 12 illustrates a subroutine for getting a main outlet pointer to cycle through available gas names. FIG. 13 illustrates a subroutine for calculating an average outlet for each gas. FIG. 14 illustrates a subroutine for a single, instantaneous instance of gas introduction by amount (lbs). FIG. 15 illustrates a subroutine for gas introduction by rate (lbs/hr) but not limited by amount. FIG. 16 illustrates a subroutine for gas introduction by rate (lbs/hr) that is limited to a specified amount. FIG. 17 illustrates a subroutine for adjusting concentration for increasing fluid mass (e.g, clean air repress).

FIGS. 18A-18F illustrates a subroutine for XGas Removal. In particular, this function calls routines for gathering removal efficiencies and setting outlet concentrations for each XGas passing through an air scrubber. Function calls are based on the type of air scrubber, defined by the "method" variable.

FIG. 19 illustrates a subroutine for returning the removal efficiency of trace contaminants in untreated, Barnebey-Sutcliffe type BD granular activated charcoal. Physical adsorption is an equilibrium process which depends on variables such as the contaminant vapor pressure, inlet concentration, molar volume, and cabin temperature. Robell developed a correlation between these physical parameters which yield an adsorption potential factor. Empirical equations relate this adsorption potential factor to a potential adsorption zone length, or the length of charcoal material available for saturation by a contaminant with the given physical characteristics. Further empirical equations relate the adsorption zone length to the rate of charcoal bed use. The removal efficiency is based on the actual adsorption zone length available and the adsorption zone length potential. To calculate the removal efficiency, an iterative loop may be utilized as bed length utilized is a function of efficiency and efficiency is a function of available length (and thus bed utilized).

FIG. 20 illustrates a subroutine for an adsorption potential factor calculation based on the Polanyi Potential Theory and the Gibbs equation: A=(T/Vm)log 10(pv/pc) where T is the fluid temperature in K, Vm is the contaminant liquid molar volume in cm3/gmol, pv is the contaminant vapor pressure at the cabin temperature expressed in concentration units of mg/m3, and pc is the cabin contaminant partial pressure expressed in concentration units of mg/m3.

FIG. 21 illustrates a subroutine for calculation of an empirical equation from NASA-TM-108456—the adsorption length increases 0.000275 m for every kgmol/cm3 of adsorption potential, based on testing at a 1.3 ft/min bed velocity. The adsorption length (Lads) at any bed velocity (BV) is related to the adsorption length at 1.3 ft/min (Lads1.3) by the equation Lads=Lads1.3*pow((BV/1.3),0.8), again derived from testing.

FIG. 22 illustrates a subroutine for calculating, as the available adsorption length approaches the predicted adsorption length, efficiency drops according to the following equation. This is a curve fit for an exponential curve including the point (1, 0.90), or an adsorption zone length for ninety percent removal.

effav=eff_max*(1−exp(−2.3025851*(avail_adsorpt_len/adsorpt_zone_len)));

Bed length utilized is a function of efficiency and efficiency is a function of available length (and thus bed utilized). Iterate to find equilibrium efficiency (calculate average available bed length in each loop).

The advantageous embodiments described herein provide for breaking down a model file into its individual components, which might be tubes, cold plates, heat exchangers, and other components of a thermal system. A solution vector may be built from the components and flow may then be simulated with fluid being transferred from one component to the next. The solution vector of components in the model file may be built at the initiation of the run. This solution vector may be a list of components in the order of their inlet dependency on other components. The component parameters may be updated in the order in which they appear in the list at every time step.

As a result of analyzing the solution vector and other elements of the model file, an approximation of the behavior of the thermal fluid system may be output for storage or for review by a user. In the case of a vehicle, such as the space shuttle, an approximate model may be created regarding how heated air flows through the various compartments of the space shuttle. Similar models may be generated for other vehicles or for buildings. The model may be used to determine whether thermal fluid flow may be considered acceptable, or whether changing the design of the closed thermal system might be desirable. Because this analysis may be performed quickly and efficiently using the advantageous embodiments described herein, the advantageous embodiments may reduce the time and expense of designing and manufacturing closed thermal fluid systems, such as but not limited to the space shuttle.

The different advantageous embodiments can take the form of an entirely hardware advantageous embodiment, an entirely software advantageous embodiment, or an advantageous embodiment containing both hardware and software elements. Some advantageous embodiments are implemented in software, which includes but is not limited to forms, such as, for example, firmware, resident software, and microcode.

Furthermore, the different advantageous embodiments can take the form of a computer program product accessible from a computer usable or computer readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the advantageous embodiments in the form disclosed. Many modifications and variations will be apparent to those of ordinary skill in the art. Further, different advantageous embodiments may provide different advantages as compared to other advantageous embodiments. The advantageous embodiment or embodiments selected are chosen and described in order to best explain the principles of the advantageous embodiments, the practical application, and to enable others of ordinary skill in the art to understand the disclosure

What is claimed is:

1. A thermal fluid modeling system, comprising:
a thermal fluid system modeler including a plurality of individual components;
a solution vector configured from the plurality of individual components and being ordered as a function of one or more inlet dependencies of the plurality of individual components;
a fluid flow simulator, embodied as one of a processor and program code residing on a non-transitory computer readable storage medium, adapted to simulate thermal energy being communicated with the flowing fluid and between first and second components of the plurality of individual components, wherein the simulation extends from an initial time to a later time step and bounds heat transfer to be only between the flowing fluid, walls of tubes formed in each of the individual components of the plurality, and between adjacent tubes; and
a component updater, embodied as one of the processor and the program code residing on the non-transitory computer readable storage medium, configured to update component parameters of the solution vector with simulation results for each of the plurality of individual components of the simulation;
wherein the component updater produces an updated solution vector with the simulation results, wherein the thermal modeling system further produces a thermal fluid model based on the updated solution vector, and wherein the thermal fluid modeler simultaneously performs all of a thermal fluid analysis, a pressure drop analysis, and a trace contaminant analysis based on the updated solution vector.

2. The thermal fluid modeling system of claim 1, wherein the fluid flow simulator is further adapted to re-simulate the flow of fluid from the first component to the second component and re-update the component parameters with respect to the later time step.

3. The thermal fluid modeling system of claim 1, wherein the simulation results comprises temperatures, flow rates, pressures, changes in pressure, tank quantities, and gas quantities, along with air scrubbing component performance.

4. A method for modeling a thermal fluid system, the method comprising:
modeling, using a physical processor, a thermal fluid system as a plurality of individual components;
configuring, using the physical processor, a solution vector from the plurality of individual components, the solution vector including a list of the plurality of individual components in an order of inlet dependency of the plurality of individual components;
simulating, using the physical processor, a flow of fluid from a first component in the plurality of individual components to a second component in the plurality of individual components, with the simulation beginning at an initial time and assuming that tubes in the plurality of individual components are well insulated so that, with respect to the tubes, heat transfers only between the fluid and a given tube wall and between the fluid and between adjacent tubes;
updating, using the physical processor, component parameters with simulation results to produce an updated solution vector;
producing a thermal fluid model based on the updated solution vector;
performing, simultaneously, all of a thermal fluid analysis, a pressure drop analysis, and a trace contaminant analysis based on the updated solution vector;
advancing, using the physical processor, the flow of fluid simulation according to a another time step; and
re-simulating, using the physical processor, the flow of fluid from the first component to the second component, re-updating the component parameters, and re-performing, simultaneously, all the thermal fluid analysis, the pressure drop analysis, and the trace contaminant analysis.

5. The method of claim 4 further comprising:
predicting component transients of the thermal fluid system.

6. The method of claim 4, wherein simulation results comprises temperatures, flow rates, pressures, changes in pressure, tank quantities, and gas quantities, along with air scrubbing component performance.

7. The method of claim 4, wherein the method is performed using a single software tool.

8. A method for one of manufacturing or modification of one of a vehicle and a building, the method comprising:
modeling, using a physical processor, a thermal fluid system as a plurality of individual components of the one of the vehicle and the building;
configuring, using the physical processor, a solution vector from the plurality of individual components, the solution vector including a list of the plurality of individual components in an order of inlet dependency of the plurality of individual components;
simulating, using the physical processor, a flow of fluid from a first component in the plurality of individual components to a second component in the plurality of individual components, with the simulation beginning at an initial time and assuming that tubes in the plurality of individual components are well insulated so that, with respect to the tubes, heat transfers only between the fluid and a given tube wall and between the fluid and between adjacent tubes;
updating, using the physical processor, component parameters with simulation results to produce an updated solution vector;
producing a thermal fluid model based on the updated solution vector;
performing, simultaneously, all of a thermal fluid analysis, a pressure drop analysis, and a trace contaminant analysis based on the updated solution vector;
advancing, using the physical processor, the flow of fluid simulation according to another time step;
re-simulating, using the physical processor, the flow of fluid from the first component to the second component, re-updating the component parameters, and re-performing, simultaneously, all the thermal fluid analysis, the pressure drop analysis, and the trace contaminant analysis to form a re-simulation;
producing, using the physical processor, and storing a result of the re-simulation; and
performing the one of manufacturing or modification of the one of the vehicle and the building using the thermal fluid model based on the result of the re-simulation.

9. The method of claim 8 wherein the one of the vehicle and the building comprises a vehicle selected from the group consisting of: a space vehicle, a maritime vehicle, an automobile, and a space shuttle.

* * * * *